United States Patent [19]

Sidler et al.

[11] Patent Number: 4,993,041
[45] Date of Patent: Feb. 12, 1991

[54] LASER PROVIDED WITH AN IMPROVED SECURING ARRANGEMENT FOR ITS ACTIVE MEDIUM AND SECURING ARRANGEMENT INTENDED FOR THE LASER

[75] Inventors: Thomas Sidler, Coffrane; Jean-Charles Poli, La Chaux-de-Fonds, both of Switzerland

[73] Assignee: Asulab S.A., Bienne, Switzerland

[21] Appl. No.: 476,950

[22] Filed: Feb. 8, 1990

[30] Foreign Application Priority Data

Feb. 9, 1989 [FR] France .................................. 89 01797

[51] Int. Cl.⁵ .............................................. H01S 3/08
[52] U.S. Cl. ...................................... 372/98; 372/65; 372/109; 372/35
[58] Field of Search ....................... 372/71, 62, 70, 72, 372/65, 92, 34, 35

[56] References Cited

U.S. PATENT DOCUMENTS

| 4,493,087 | 1/1985 | Laakman et al. | 372/64 |
| 4,528,671 | 7/1985 | Robbins | 372/66 |
| 4,730,324 | 3/1988 | Azad | 372/72 |
| 4,881,233 | 11/1989 | Von Arb et al. | 372/72 |

Primary Examiner—Léon Scott, Jr.
Attorney, Agent, or Firm—Griffin Branigan & Butler

[57] ABSTRACT

An optically pumped laser comprising a securing arrangement (14) for the bar assuring, on one hand, the rigid interconnection of the bar (4) and the framework (12a, 12b, 12c, 12d) by gripping the former and in bearing on the latter and, on the other hand the thermal insulation of the lateral faces of the bar. The securing arrangement (14) is obtained from an elastically deformable fitting of plastics material.

18 Claims, 3 Drawing Sheets

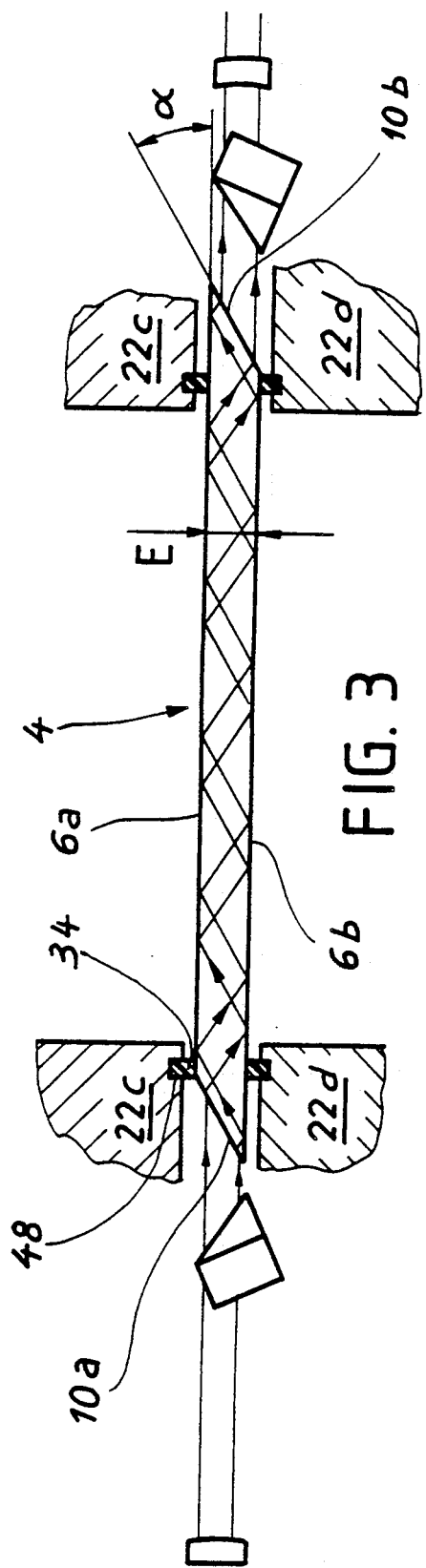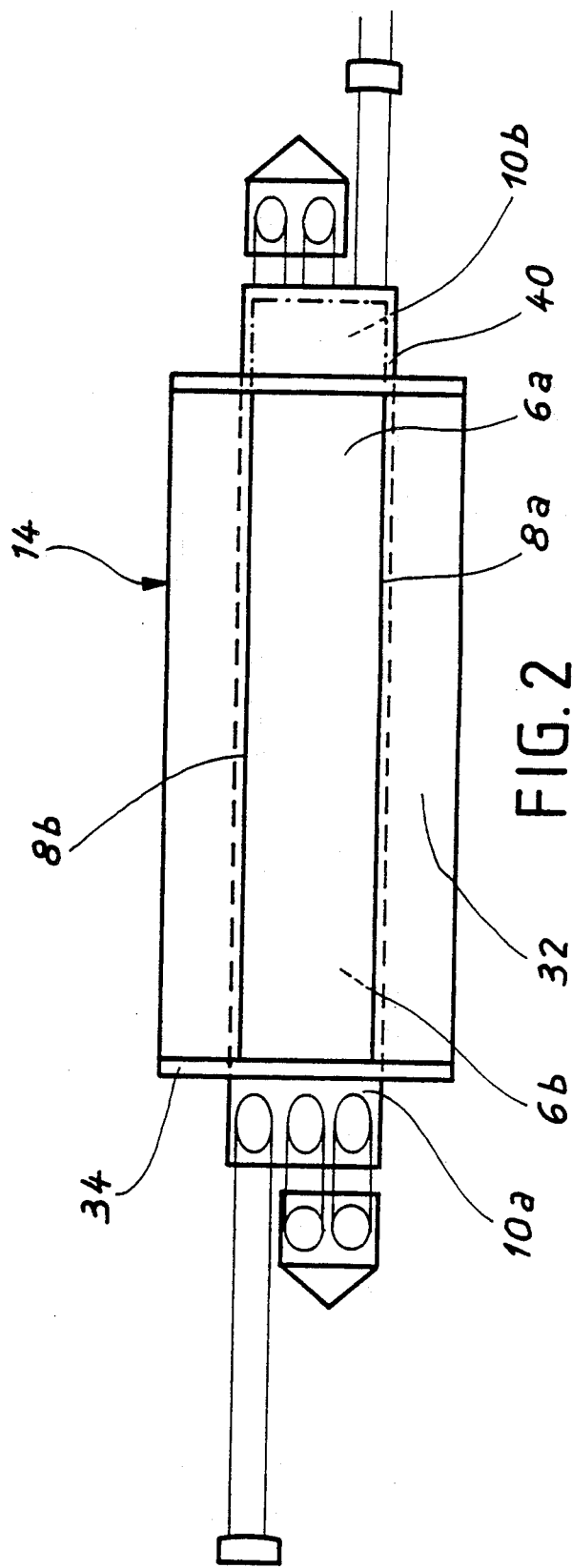

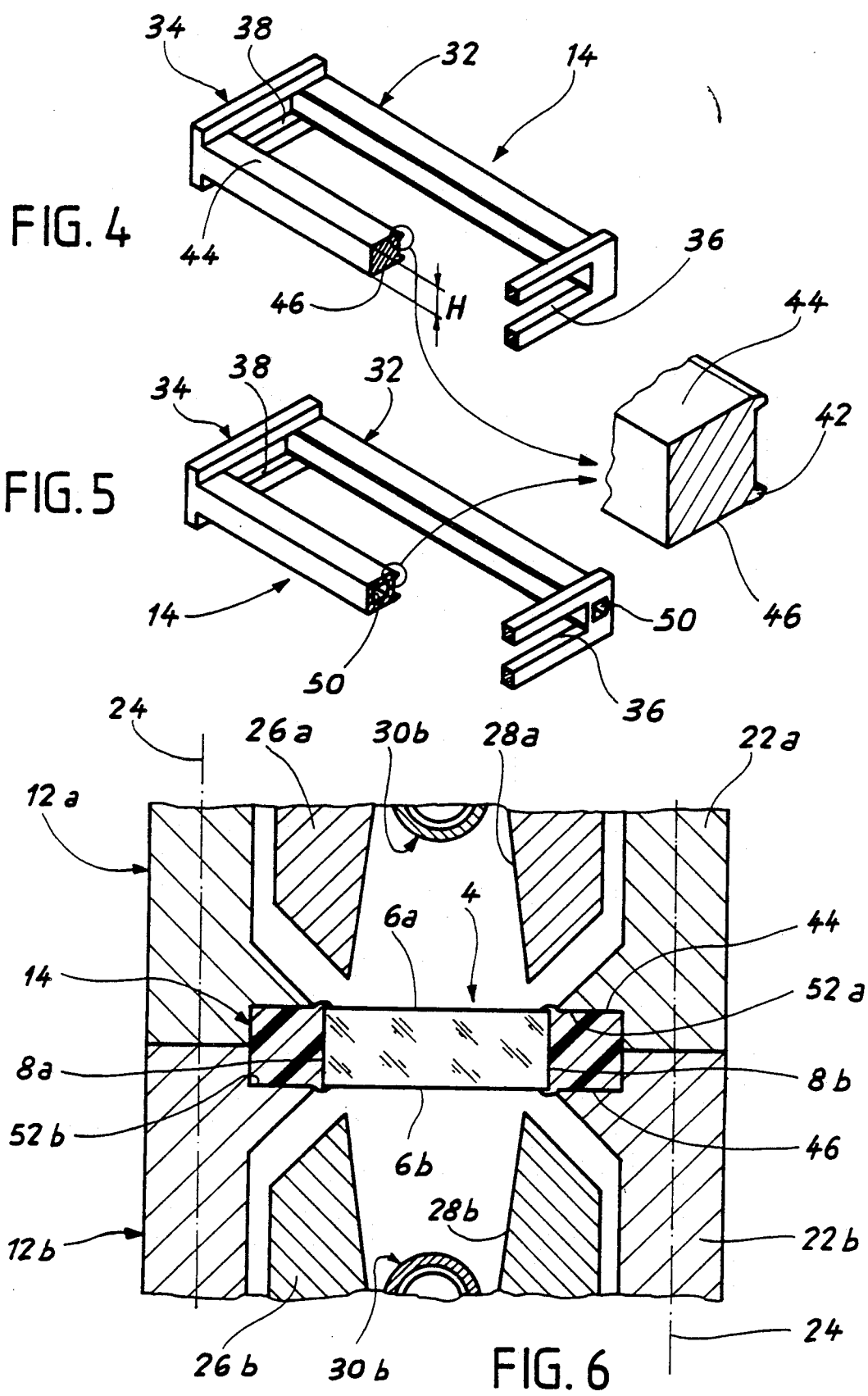

LASER PROVIDED WITH AN IMPROVED SECURING ARRANGEMENT FOR ITS ACTIVE MEDIUM AND SECURING ARRANGEMENT INTENDED FOR THE LASER

This invention concerns lasers, in particular optically pumped lasers employing as an active medium bars of the SLAB type and, more particularly, an arrangement for securing these bars in such lasers.

BACKGROUND OF THE INVENTION

There is already known from U.S. Pat. No. 4,378,601 an optically pumped laser having a securing arrangement for a SLAB type bar. This laser essentially comprises a housing intended to accommodate the bar and in which circulates a cooling fluid. Further, the laser comprises a luminous source arranged on either side of the bar in order to bring about optical pumping in the active medium. The bar is mounted in a securing arrangement which may be introduced into the housing or withdrawn therefrom.

Such securing arrangement comprises on one hand first longitudinal support means having a U-formed section and which are provided with lugs at their ends, these means enveloping the upper and lower faces of the bar, and on the other hand second support means having a complementary configuration to those of the ends of the bar in order to be attachable thereto. The lugs of the first support means cooperate with slots provided in the second support means in order to maintain the bar in a rigid framework intended to be installed in a housing.

This securing means has the advantage of being capable of rigidly maintaining the bar in the laser without causing mechanical stresses in the latter. One thus avoids risks of variations in the refractive index in the bar, such variations having as an effect to change the quality of the laser beam.

However, this arrangement also gives rise to a difficulty. Effectively, since the bar is totally immersed in the cooling fluid except for its extremities, the lateral faces thereof are cooled just as the upper and lower faces. Consequently, the temperature profile following a path perpendicular to the upper and lower faces of the bar, varies according to whether the path is close to or remote from a lateral face, and this brings about edge effects diminishing the yield of the laser.

Another arrangement for securing the bar in a laser described in U.S. Pat. No. 4,761,789, attempts to overcome this difficulty in isolating the lateral faces of the bar from the cooling fluid. This laser comprises a bar placed between two transparent laminae, the bar and the laminae being arranged between two supporting plates, each of which includes a rectangular opening which extends substantially over the length of the bar. Sealing gaskets assure the sealing at the periphery of the opening between the laminae and the supporting plates. To these openings are adapted pumping reflectors having a cross-section substantially in the form of a U which, with the laminae, bound a circulation space for a cooling fluid as well as a housing for an optical excitation source for the bar. Finally, between each supporting plate and the outer framework is provided a bracing frame bounding a second cooling channel, the assembly being mechanically clamped in order to guarantee good securing of the bar and good sealing.

At the same time, the solution suggested by the above-mentioned document does not bring about entire satisfaction. Effectively, during the mechanical clamping of the assembly, the clamping effort is not controlled with the result that it is very difficult to obtain an appropriate clamping.

If the clamping force is too great, there result mechanical stresses in the bar and thence variations in the refractive index which change the quality of the beam.

On the other hand, if the clamping force is insufficient, the transmission of the quantity of heat through the laminae, the support plates etc. diminishes thereby causing a drop in the laser yield.

The invention has as its main purpose to remedy the difficulties of the above-mentioned prior art in disclosing a laser provided with a securing arrangement for the bar eliminating the influence of the clamping force while thermally insulating the lateral faces of the bar.

SUMMARY OF THE INVENTION

To this effect this invention has as its objective an optically pumped laser in which the laser medium is formed by a bar having at least two opposed faces between which the generated laser beam propagates along a zig-zag path by total reflection from said faces, said bar being arranged in a framework with which it bounds at least two opposed cavities for which said opposed faces of the bar form wall portions, each cavity being opposite to said pumping faces accommodating optical excitation means and being adapted to be traversed by a cooling fluid, the laser likewise comprising a securing means for the bar assuring on one hand the rigid inter-connection of the bar and the framework by gripping the bar and in bearing on said framework, and on the other hand insulating the lateral faces of the bar from the cooling fluid.

In conformity with the invention, the securing means is provided by a fitting of elastically deformable plastics material.

Thanks to this arrangement, the securing of the bar in the laser is facilitated whilst eliminating the influence of the clamping force on the beam characteristics.

Furthermore, thanks to the elastic characteristics of the securing means, the dilatation of the bar may be readily absorbed during substantial temperature variations. There thus results therefrom an absence of mechanical stresses in the bar, thereby to increase the yield and the quality of the beam.

According to a preferred embodiment of the invention, the fitting comprises at least two elongated strigers each applied against a lateral face of the bar and clamped in the framework in order to assure the thermal insulation of said faces and at least four associated fitting elements associated two by two extending transversally to the longitudinal direction of the strigers proximate the ends of these latter, said fitting elements being interposed and clamped between said opposed faces and the framework in order to assure the rigid interconnection of the bar relative to the framework.

The invention has also as its objective a securing arrangement of a bar intended to equip an optically pumped laser comprising a bar forming the laser medium and a framework.

This securing means is characterized in that it is obtained by a fitting of elastically deformable plastics material.

Such a securing arrangement thus enables facilitating the assembly and disassembly of the bar into and out of the framework without risking deterioration of the bar.

Finally, the invention has also as objective an active element for an optically pumped laser comprising a bar and a securing means for this bar such as defined hereinabove, this active element being formed by a cassette making up a portion of the framework.

Other characteristics and advantages of the invention will clearly appear following reading of the description to follow of the various non-limiting embodiments and considering the attached drawings.

BRIEF DESCRIPTION OF THE DRAWINGS

FIGS. 2 and 3 show respectively a partial face view in cross-section and a view from above of a bar provided with a securing arrangement according to the invention;

FIG. 4 is a schematic view in broken away perspective of a first embodiment of a fitting intended to equip a laser according to the invention;

FIG. 5 is a schematic view in broken away perspective of a second embodiment of a fitting intended to equip a laser according to the invention;

FIG. 6 shows a partial cross-section of a second embodiment of a laser according to the invention.

DESCRIPTION OF THE PREFERRED EMBODIMENT

Figure 1:
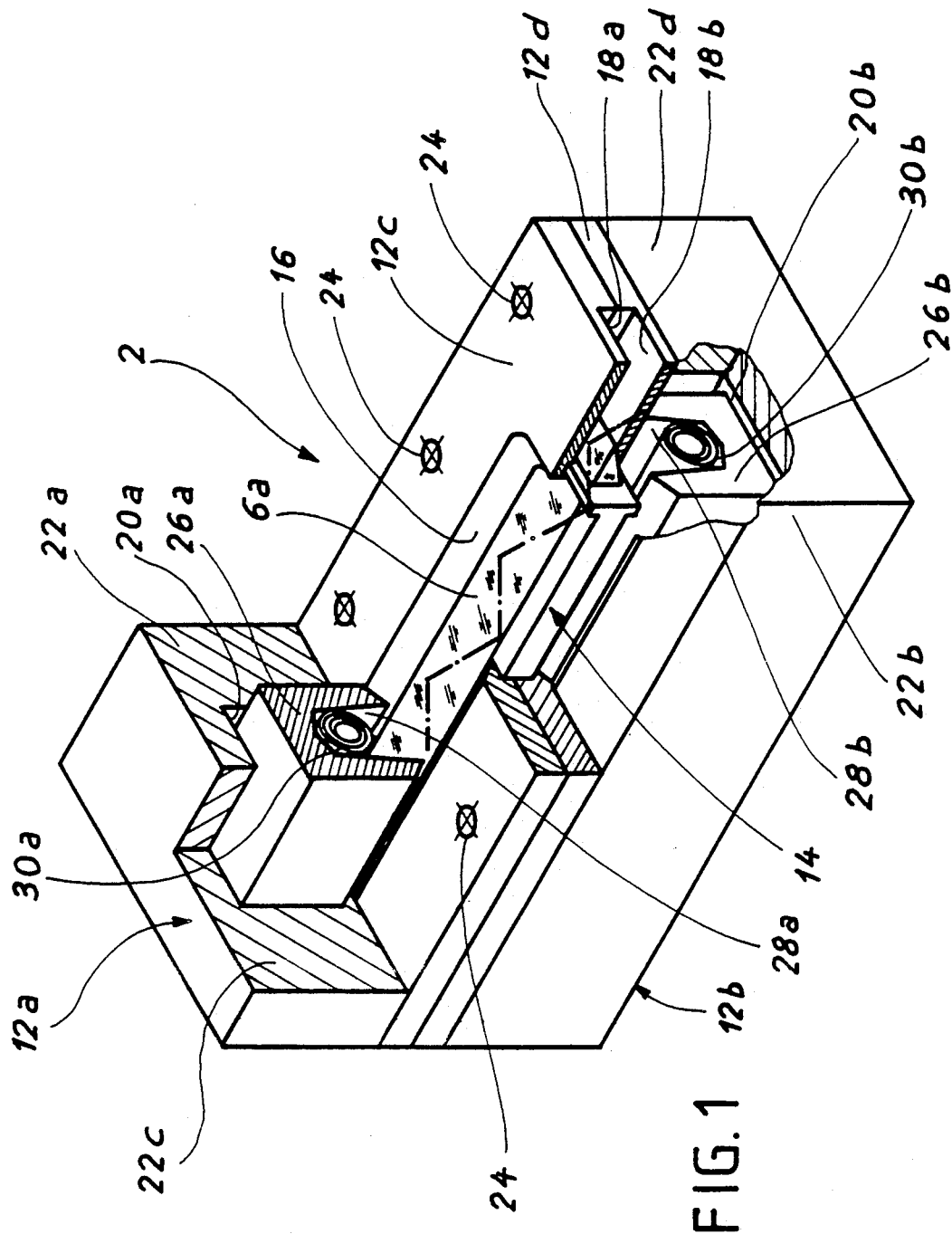
FIG. 1 is a schematic view in broken away perspective of a first embodiment of a laser in accordance with the invention.

Referring to FIGS. 1 to 3, one sees an optically pumped laser generally designated by reference number 2 and showing the essential characteristics of the invention.

A bar 4 of the SLAB type constitutes the medium in which the laser effect is generated. In the embodiment shown, the bar 4 exhibits a rectangular cross-section of two major opposed faces 6a, 6b which are, in this case, at the same time pumping faces and total reflection faces in order to confer a zig-zag path to the generated cylindrical laser beam.

Bar 4 also shows two lateral faces 8a, 8b and two end faces 10a, 10b.

In the example shown, the end faces of the bar are cut substantially according to the Brewster angle $\alpha$ in order to reduce losses. As is well understood, the end faces may also be rectilinear or inclined by $180° - 2\alpha$ relative to the optical axis of the laser.

Bar 4 is arranged in an assembly comprising essentially a framework in two parts 12a, 12b and a bar securing arrangement designated generally by the reference number 14. The two parts of the framework extend symmetrically on either side of faces 6a, 6b of the bar.

In this case, framework 12a, 12b likewise comprises two additional elements 12c, 12d forming a cassette in which bar 4 is mounted.

Each cassette element is formed of solid metal, preferably stainless steel, and is generally of a planar form. Furthermore, each element 12c, 12d comprises on one hand an opening 16 of a substantially elongated rectangular form provided in its central portion in order to permit passage of the excitation light for the bar. On the other hand, each element 12c, 12d exhibits at its ends and in the extension of said opening 16 a groove 18a, 18b opening out towards the exterior. Thus, when the elements of a cassette are assembled, these grooves which face one another, define a window opposite each end face 10a, 10b of the bar. These windows permit the passage of the laser beam.

It will be noted that this cassette constitutes in an advantageous manner an independent element of the laser which is capable of being rapidly and easily installed therein.

Each part of framework 12a, 12b exhibits a base 20a, 20b having the form of an elongated rectangle from which extend perpendicularly two lateral walls 22a, 22b and two end walls 22c, 22d defining a cavity in which circulates a cooling fluid (not shown).

The two parts of framework 12a, 12b are coupled together via a plurality of screws 24 shown on the drawing by the outlines of their axes.

It will be likewise noted that in the example as shown each portion of framework 12a, 12b is obtained by machining from a single piece.

As is well understood, these latter could be formed in several pieces and assembled by screwing together or the like.

Each part of framework 12a, 12b further comprises a pumping reflector 26a, 26b rigidly fastened to its base 20a, 20b. These reflectors 26a, 26b are elongated parts exhibiting a transversal cross-section substantially in the form of a U and which extend above faces 6a, 6b of the bar over the entire length thereof. The bottom and the lateral walls of each reflector 26a, 26b are formed in a manner to exhibit reflection faces 28a, 28b completed for instance by a layer of gold or diffusing material such as magnesium oxide.

The parts of framework 12a, 12b likewise each form a support and housing for an optical excitation source 30a, 30b for the bar. Each excitation source is constituted by a tube accommodating a discharge lamp and bounding around the latter a circulation channel for a cooling fluid.

The laser according to the invention illustrated on FIGS. 1 to 3 exhibits a first assembly mode of the securing arrangement 14.

This securing arrangement 14 of the bar is constituted by a fitting of elastically deformable plastics material. Preferably the fitting is obtained from a plastics material which makes up part of the chemical group of silicones. As is well understood, any other material exhibiting elastic deformation characteristics and thermal isolation characteristics similar to those of the silicones may also be suitable.

The fitting 14 has as functions to assure on the one hand the rigid interconnection of the bar 4 and the framework 12a, 12b in gripping the former and in bearing on the latter, and on the other hand to assure thermal insulation of the lateral faces 8a, 8b of the bar in order to obtain a uniform temperature distribution in the planes parallel to the pumping faces of the bar. There results therefrom a diminution of the edge effects which increase thereby yield of the laser. To this effect, this fitting exhibits a configuration (to be described more precisely hereinafter) such that it may receive the bar and be easily placed in the cassette making up part of the framework (FIG. 1) or directly into the framework (FIG. 6) according to the case.

As brought out in particular from FIG. 4, one may see that fitting 14 provided in a single piece for instance by moulding, essentially comprises two elongated parallel strigers 32 and four fitting elements 34 hereinafter referred to as traverses, associated two by two. The strigers 32 are spaced from one another by a distance corresponding substantially to the width of the bar and the traverses extend transversally to the longitudinal direction of these latter in order to couple them at their ends.

The fitting thus defines two windows 36, 38 having the dimensions of the cross-section of the bar which is intended to be accommodated. Each window is formed by the traverses and the end part of each striger.

Referring also to FIGS. 2 and 3, it is seen that the bar may be readily introduced by one end in the windows and maintained by the traverses and that in an advantageous manner, the clamping of the bar through a seal is effected in an edge zone 40 where the beam is not reflected with the result that the yield of the laser is not diminished.

Thus, when the bar is put into place in the fitting, the strigers are applied by their opposing faces against the lateral faces of the bar and extend substantially over that portion of the length of this latter comprised between its bevelled portions.

Preferably, the strigers each have a height H substantially equal to the thickness E of the bar and the two edges of the opposing faces of each striger are each provided with a lip 42 extending over the length of the latter.

Thus, each pair of lips associated with a striger defines a groove for accommodating the bar such that the lips cover over the edge zones of the opposite faces 6a, 6b of the bar when the latter is put into place in the fitting.

Furthermore, the traverses coupling the strigers are arranged in order to appear as an extra thickness on either side of the upper 44 and lower 46 faces of the strigers, so that these traverses, intended to be interposed between the opposite faces 6a, 6b and the framework, may be easily clamped and deformed in order to maintain the bar in the framework.

Furthermore, in order to facilitate the machining operations of the parts of the framework receiving the fitting and to be adapted to the profile of the lateral faces 8a, 8b of the bar, the strigers and the traverses exhibit a substantially squared off cross-section.

Preferably, the zones of the framework coming into contact with said traverses exhibit grooves 48 (FIG. 3) having forms complementary to those of the traverses. As may be well understood, these grooves have a depth such that when the bar is clamped in the framework this latter does not come into contact with the bar.

There results from this configuration that positioning the bar in the framework is facilitated while eliminating the risk of direct contact between the framework and the bar as much during the assembly within the laser as during its utilization.

In a variant of the fitting according to the invention shown on FIG. 5, there has been provided in each striger a hollowed out portion 50 traversing the latter throughout. This hollowed out portion formed during the time of manufacture of the seal assures better thermal insulation of the lateral faces of the bar creating an air channel between the framework and these latter.

In order to avoid too rapid aging of the fitting due to too great exposure of the latter to luminous radiations during operation of the laser, it is advantageous to provide the portions of the bar coming directly into contact with the fitting with a protective layer (not shown) forming a screen and constituted by a metallic layer deposited under vacuum It will also be noted that according to the invention of the fitting assures, in addition to the thermal insulation of the lateral faces of the bar, sealing of the cavity containing the cooling fluid with respect to the exterior.

Thus, in referring to FIG. 6, there is seen a second assembly mode of the securing arrangement 14 of a bar 4 in a laser in which one has designated elements identical to those previously described by the same reference numbers.

While in the assembly mode shown on FIG. 1 the framework comprises a cassette in which the bar is mounted by means of the fitting in accordance with the invention, in the second assembly mode the framework comprises only two elements which cooperate directly with the fitting 14 in order to secure bar 4 in the laser. In this arrangement, the end parts of the two lateral walls 22a, 22b and the two end walls 22c, 22d of the framework exhibit a complementary configuration to the portion of the seal with which they come into functional contact. Thus the end portions of lateral walls 22a, 22b show a discontinuity forming a step 52a, 52b directed towards the cavity with the result that, when the two parts of framework 12a, 12b are assembled, the two steps of part 12a of the framework each cooperate with the facing steps 52b provided in the other portion 12b of the framework in order to bound the seatings intended to receive the strigers of the fitting 14.

As is well understood, the invention is not limited to the embodiments described and one may readily foresee variants without departing from the basis thereof. In particular, one might employ the arrangement according to the invention in a laser in which the active medium is a fluid, this latter being confined within a sealed enclosure of a transparent material having the form of a bar of the SLAB type.

What we claim is:

1. An optically pumped laser in which a laser medium comprises a bar having at least two opposed faces between which a generated laser beam propagates along a zigzag path by total reflection from said opposed faces, and two lateral faces extending perpendicularly to said opposed faces, a framework in which said bar is positioned, said bar and said framework together bounding at least two opposed cavities with said opposed faces of said bar forming wall portions of said cavities, each said cavity having therein optical excitation means and a circulation channel for a cooling fluid, said laser further including bar securing means comprising an elastically deformable fitting of plastic material, said fitting gripping said bar and bearing on said framework to rigidly position said bar relative to said framework while thermally insulating said lateral faces.

2. An optically pumped laser as set forth in claim 1 wherein said fitting comprises at least two elongated strigers, each having a surface applied against a respective one of said lateral faces and clamped in said framework to thermally insulate said lateral faces, and at least four fitting elements associated two by two and extending transversely to the longitudinal direction of said strigers proximate their ends, at least two of said fitting elements being interposed and clamped between each of said opposed faces and said framework to rigidly position said bar relative to said framework.

3. An optically pumped laser as set forth in claim 2 wherein said strigers are hollowed out in their longitudinal direction.

4. An optically pumped laser as set forth in claim 3 wherein the transversal cross section of said strigers and said fitting elements is of quadrilateral form.

5. An optically pumped laser as set forth in claim 2 wherein in the transversal cross section of said strigers and said fitting elements is of quadrilateral form.

6. An optically pumped laser as set forth in claim 2 wherein two edges of a surface of each striger applied against said lateral faces are each provided with a lip extending over the length thereof.

7. An optically pumped laser as set forth in claim 2 wherein said fitting is integrally formed in a single piece.

8. An optically pumped laser as set forth in claim 2 wherein said fitting comprises a silicone material.

9. A bar securing arrangement for an optically pumped laser of the type having a bar forming a laser medium and a framework, said bar securing arrangement comprising an elastically deformable fitting of plastic material for supporting a bar relative to a framework.

10. A bar securing arrangement as set forth in claim 9 wherein said fitting is a monolithic member.

11. A bar securing arrangement as set forth in claim 9 wherein said fitting comprises a silicone material.

12. An active element for an optically pumped laser of the type having a framework including a removable cassette, said active element comprising a bar supported in a bar securing arrangement as set forth in claim 9, said bar securing arrangement being mounted in the removable cassette.

13. A bar securing arrangement for a bar of an optically pumped laser of the type having a framework and a lasing medium in the form of a bar having at least two opposed faces between which a laser beam is propagated along a zigzag path by total reflection from said opposed faces, and two lateral faces extending perpendicularly to said opposed faces, the framework of the laser having means for receiving and clamping a bar securing arrangement, said bar securing arrangement comprising an elastically deformable fitting of plastic material for receiving and supporting a bar by engagement with its lateral faces, said fitting being receivable by said framework whereby a bar is positionable relative to a framework but is thermally insulated from the framework by said fitting.

14. A bar securing arrangement as set forth in claim 13 wherein said fitting comprises at least two elongated strigers for engaging said lateral faces, said strigers being receivable in the framework, and at least four fitting elements associated two by two extending transversely to the longitudinal direction of said strigers proximate their ends, said fitting elements being interposed and clamped between said opposed faces and the framework to rigidly position a bar relative to the framework when a bar is engaged by said strigers and said fitting is clamped in the framework.

15. A bar securing arrangement as set forth in claim 14 wherein said strigers are hollowed out in their longitudinal direction.

16. A securing arrangement as set forth in claim 15 wherein the cross section of said strigers and said fitting elements is quadrilateral in form.

17. A bar securing arrangement as set forth in claim 14 wherein the cross section of said strigers and said fitting elements is quadrilateral in form.

18. A bar securing arrangement as set forth in claim 14 wherein two edges of a surface of each striger engaging said lateral faces are each provided with a lip extending over the length thereof.

* * * * *